United States Patent
Cociglio

(10) Patent No.: US 11,218,393 B2
(45) Date of Patent: Jan. 4, 2022

(54) PERFORMANCE MEASUREMENT ON A MULTIPOINT PACKET FLOW

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 22 days.

(21) Appl. No.: 16/095,841

(22) PCT Filed: Apr. 29, 2016

(86) PCT No.: PCT/EP2016/059610
§ 371 (c)(1),
(2) Date: Oct. 23, 2018

(87) PCT Pub. No.: WO2017/186302
PCT Pub. Date: Nov. 2, 2017

(65) Prior Publication Data
US 2020/0067806 A1 Feb. 27, 2020

(51) Int. Cl.
*H04L 12/26* (2006.01)
*H04L 12/24* (2006.01)

(52) U.S. Cl.
CPC ...... *H04L 43/0829* (2013.01); *H04L 41/5009* (2013.01); *H04L 43/087* (2013.01);
(Continued)

(58) Field of Classification Search
CPC ............ H04L 43/0829; H04L 41/5009; H04L 43/0858; H04L 43/0864; H04L 43/087; H04L 43/106; H04L 43/12; H04L 43/0835
See application file for complete search history.

(56) References Cited

U.S. PATENT DOCUMENTS

| | | |
|---|---|---|
| 2011/0255440 A1 | 10/2011 | Cociglio et al. |
| 2012/0275333 A1 | 11/2012 | Cociglio |

(Continued)

FOREIGN PATENT DOCUMENTS

| | | |
|---|---|---|
| WO | WO 2010/072251 A1 | 7/2010 |
| WO | WO 2011/079857 A1 | 7/2011 |
| WO | WO 2013/174417 A1 | 11/2013 |

OTHER PUBLICATIONS

Capello et al.; A packet based method for passive performance monitoring; Feb. 25, 2013; Telecom Italia; pp. 10-12; https://tools.ietf.org/html/draft-tempia-opsawg-p3m-03.*

(Continued)

*Primary Examiner* — Jackie Zuniga Abad
(74) *Attorney, Agent, or Firm* — Oblon, McClelland, Maier & Neustadt, L.L.P.

(57) ABSTRACT

A method for performing a performance measurement on a multipoint packet flow transmitted in a packet-switched subnetwork. A monitoring network of measurement points is implemented in the subnetwork. All packets have a marking value, which is periodically switched between first and second marking values. Each measurement point receiving a marked packet updates a couple of performance parameters, one per each marking value. Since not all the measurement points receive the same packets of the multipoint packet flow, to provide a performance measurement a cluster of measurement points is firstly identified in the monitoring network, which possesses the following property: each packet received at the input of the cluster is also received at the output of the cluster, if no packet loss occurs. The performance parameters provided by input and output measurement points of the identified cluster are then used for providing the performance measurements.

17 Claims, 8 Drawing Sheets

(52) U.S. Cl.
CPC ...... *H04L 43/0858* (2013.01); *H04L 43/0864* (2013.01); *H04L 43/106* (2013.01); *H04L 43/12* (2013.01)

(56) References Cited

U.S. PATENT DOCUMENTS

2013/0223274 A1* 8/2013 Cociglio ................. H04L 43/08
370/253
2014/0286343 A1* 9/2014 Sung ....................... H04L 45/24
370/400
2015/0109953 A1 4/2015 Cociglio

OTHER PUBLICATIONS

International Search Report dated Nov. 9, 2016, in PCT/EP2016/059610 filed Apr. 29, 2016.
Anonymous, "OAM functions and mechanisms for Ethernet based networks; G.8013/y. 1731 (08.15) The ITU-T Recommendation Y.1731", ITU-T Standard, Chapter 8,(102 total pages).

\* cited by examiner

PERFORMANCE MEASUREMENT ON A MULTIPOINT PACKET FLOW

TECHNICAL FIELD

The present invention relates to the field of communication networks. In particular, the present invention relates to a method for performing a performance measurement on a multipoint packet flow transmitted in a packet-switched communication network. Further, the present invention relates to nodes and computers for communication network configured to implement such a method, and to computer networks comprising such nodes and computers.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Besides, packets may be discarded by a node since they contain bit errors.

Moreover, each packet is transmitted at a transmission time by the source node and is received at a reception time by the destination node (if it is not lost). The time elapsing between transmission time and reception time is typically called "one-way delay". The one-way delay of a packet mainly depends on the number of possible intermediate nodes crossed by the packet from source to destination, the permanence time of the packet at each node and the propagation time along the links.

Furthermore, packets may have different one-way delays. The difference between the one-way delays of two packets of a same packet flow is termed "interarrival jitter" (or, briefly, "jitter").

When a communication service (in particular, a real-time voice or data service such as call, conference call, video conference, etc.) is provided by means of a packet-switched network, a performance measurement in terms of packet loss, one-way delay and jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

The ITU-T Recommendation Y.1731 (08/2015), Chapter 8 (pages 28-38) discloses OAM (Operation, Administration and Maintenance) functions for performance monitoring including measurement of frame loss ratio, frame delay and frame delay variation, which provides for injecting OAM frames in the packet flow to be measured.

Besides, the known RTP (Real-time Trasport Protocol) and MPEG (Moving Picture Experts Group) protocol make use of sequence numbers inserted into packets in order to perform performance measurements.

WO 2010/072251 (in the name of the same Applicant) discloses a method for measuring packet loss of a packet flow transmitted from a transmitting node to a receiving node. Before transmitting each packet, the transmitting node marks it with either a first marking value or a second marking value. The marking value is switched with a marking period of e.g. 5 minutes, thereby dividing the packet flow in alternating blocks. Both the transmitting node and the receiving node implement a couple of counters, one for counting packets marked with the first marking value and the other for counting packets marked with the second marking value. By comparing the transmission-side and reception-side counters relating to packets marked by a same marking value, the packet loss during each marking period may be measured.

WO 2011/079857 (in the name of the same Applicant) discloses a method for performing a time measurement on a packet flow which provides—in addition to the marking and counters described by WO 2010/072251—to generate a transmission timestamp and a reception timestamp for one or more predefined sample packets of each marking period. Such timestamps are used for calculating one-way delay and/or jitter exhibited by the sample packets in each marking period.

WO 2013/174417 (in the name of the same Applicant) discloses a method for performing a time measurement on a packet flow which provides for calculating an average delay and/or an average jitter for each marking period based on cumulative transmission and reception timestamps generated for each marking period and on the counted number of packets transmitted and received during the same marking period.

SUMMARY OF THE INVENTION

The Applicant has noticed that the techniques provided by ITU-T Recommendation Y.1731 (08/2015) or by the known RTP and MPEG protocols allow monitoring the performance of a point-to-point packet flow, namely a packet flow made of packets having a number of header fields (also termed "identification fields" herein after) with the same values. This way, all the packets of the point-to-point packet flow are treated the same way by the nodes and accordingly follow a same path from a same source node to a same destination node, so that the measured packet flow is the same (namely, it comprises the same packets) at each measurement point implemented along the path. For instance, in TCP/IP networks all the packets of a point-to-point packet flow have the same value in the following identification fields: Source Address field, Destination Address field, Protocol field, Source Port field, Destination Port field and DSCP field.

However, in some cases, it may be of interest monitoring the performance of a so-called "multipoint packet flow". In the present description and in the claims, the expression "multipoint packet flow" will designate a packet flow comprising packets which are transmitted along two, or more, at least partially non overlapping end-to-end paths, so that different packets of the multipoint packet flow may be received at different measurement points implemented along those paths.

For instance, a multipoint packet flow may comprise two or more point-to-point packet flows with different source nodes and/or different destination nodes. Alternatively or in addition, a multipoint packet flow may comprise a point-to-point packet flow whose packets, e.g. due to a load balancing algorithm, are transmitted from a same source node to a same destination node via different intermediate nodes.

In order to measure the performance of a multipoint packet flow, the Applicant has noticed that the above described known techniques provided by ITU-T Recommendation Y.1731 (08/2015) or by the known RTP and MPEG protocols are not efficient from the computational point of view. Indeed, in order to provide a cumulative performance measurement of the multipoint packet flow, each point-to-point packet flow comprised in the multipoint packet flow shall be separately measured. In case of a multipoint packet flow comprising several point-to-point packet flows, this disadvantageously results in a high number of performance parameters (e.g. counters and/or timestamps) to be generated or updated, gathered and then merged to provide a cumulative performance measurement of the multipoint packet flow as a whole.

In view of the above, the Applicant has tackled the problem of providing a method for performing a performance measurement in a packet-switched communication network, which overcomes the aforesaid drawbacks.

In particular, the Applicant has tackled the problem of providing a method for performing a performance measurement in a packet-switched communication network, which allows to measure the performance of a multipoint packet flow in a more computationally efficient way.

In the following description and in the claims, the expression "performing a performance measurement on a packet flow" will designate an operation of measuring:
- a one-way delay, a two-way delay or a jitter induced on packets of said packet flow by transmission between the two measurement points; and/or
- a packet loss induced on packets of said packet flow by transmission between the two measurement points.

According to embodiments of the present invention, the above problem is solved by a method for performing a performance measurement on a multipoint packet flow which makes use of the marking technique described by WO 2010/072251.

In particular, according to embodiments of the present invention, each packet of the multipoint packet flow is marked by either a first marking value V0 or a second marking value V1, before being transmitted by the respective source node. The marking value is periodically switched between V0 and V1 with a certain marking period Tb so that, during each marking period, only packets of the multipoint packet flow with a certain marking value V0 or V1 are transmitted from the source node(s) to the destination node(s).

Further, a monitoring network of measurement points is implemented in the subnetwork supporting transmission of the multipoint packet flow. Each measurement point provides a respective couple of performance parameters (e.g. counters), one relating to packets marked by V0 and the other relating to packets marked by V1.

In order to provide a performance measurement on the multipoint packet flow PF using the couples of performance parameters provided by the measurement points of the monitoring network, at least one cluster of measurement points is preferably identified in the monitoring network, a cluster being defined as a set of measurement points of the monitoring network which exhibits the property that the ensemble of the packets received at the input measurement point(s) of the cluster is the same as the ensemble of the packets received at the output measurement point(s) of the cluster, if no packet loss occurs. In other words, if no packet loss occurs, each packet received by anyone of the cluster input measurement points is also received at one of the cluster output measurement points.

This way, for each identified cluster, the ensemble of the couples of performance parameters provided by the cluster input measurement point(s) is advantageously commensurable with the ensemble of the couples of performance parameters provided by the cluster output measurement point(s).

Hence, at the end of each marking period, the performance parameters relating to packets transmitted during the last marking period (and therefore having a same marking value) and provided by all the input and output measurement points of the cluster may be combined to provide a performance measurement of the multipoint packet flow during the last marking period.

Advantageously, such performance measurement of the multipoint packet flow is obtained without relying on separate performance measurements of the point-to-point packet flows forming the multipoint packet flow, which would require generating/updating, gathering and merging the performance parameters of each single point-to-point packet flow. The performance measurement method is accordingly very efficient from the computational point of view.

According to a first aspect, the present invention provides a method for performing a performance measurement on a multipoint packet flow transmitted in a subnetwork of a packet-switched communication network, the method comprising:

a) implementing in the subnetwork a monitoring network comprising a plurality of measurement points;

b) before transmitting each packet of the multipoint packet flow, marking the packet by setting a marking field thereof to a marking value equal to either a first marking value or a second marking value, the marking comprising periodically switching between the first marking value and the second marking value;

c) at each measurement point of the monitoring network, receiving at least one of the marked packets and, if the at least one of the marked packets is marked by the first marking value, updating a performance parameter;

d) providing the performance measurement on the multipoint packet flow, said providing comprising:
   identifying in the monitoring network a cluster of measurement points, the cluster of measurement points being a set of measurement points of the monitoring network selected so that, if no packet loss occurs, each packet received by at least one input measurement point of the cluster is also received at at least one output measurement point of the cluster; and
   providing the performance measurement on the multipoint packet flow using performance parameters provided by the at least one input measurement point and the at least one output measurement point of the cluster.

Preferably, identifying the cluster comprises:
identifying in the monitoring network each couple of measurement points connected by a respective virtual link;
grouping couples of measurement points having a same originating measurement point; and
further grouping couples and/or groups of couples having at least one terminating measurement point in common, the further grouping providing the cluster.

Preferably, step d) also comprises:
identifying at least two adjacent clusters and grouping the at least two clusters in a further cluster; and
providing the performance measurement on the multipoint packet flow using performance parameters provided by at least one input measurement point and at least one output measurement point of the further cluster.

Preferably, the further cluster is the monitoring network as a whole.

According to some embodiments, at step b) the switching between the first marking value and the second marking value is performed for all the packets of the multipoint packet flow with a maximum mismatch of half a marking period Tb.

Preferably, step c) comprises identifying the at least one marked packet by checking whether at least one identification field of the at least one marked packet has a predefined value, the at least one identification field comprising a source address field and/or a destination address field.

Preferably, step c) performed by each measurement point comprises updating a counter indicative of a number of packets marked by the first marking value received at the measurement point during a marking period.

Preferably, step c) performed by each measurement point also comprises updating an average timestamp indicative of an average time at which packets marked by the first marking value are received at the measurement point during a marking period.

Preferably, at step d) said providing the performance measurement comprises calculating a packet loss for the cluster as a difference between:
- a summation of counters provided by the at least one input measurement point of the cluster at the end of the marking period; and
- a summation of counters provided by the at least one output measurement point of the cluster at the end of the marking period.

Preferably, at step d) said providing the performance measurement comprises calculating an average one-way delay for the cluster as a difference between an average output timestamp and an average input timestamp, wherein:
- the average output timestamp is a weighted summation of average timestamps provided by the at least one output measurement point at the end of the marking period divided by the summation of counters provided by the at least one output measurement point, the weight for the average timestamp provided by each output measurement point being the counter provided by the same output measurement point; and
- the average input timestamp is a weighted summation of average timestamps provided by the at least one input measurement point at the end of the marking period divided by the summation of counters provided by the at least one input measurement point, the weight for the average timestamp provided by each input measurement point being the counter provided by the same input measurement point.

Preferably, at step d) said providing said performance measurement comprises calculating a jitter based on:
- timestamp provided by the at least one input measurement point for a first packet received during the marking period and a timestamp provided by the at least one input measurement point for a last packet received during the marking period;
  - timestamp provided by the at least one output measurement point for a first packet received during the marking period and a timestamp provided by the at least one output measurement point for a last packet received during the marking period; and
  - number of packets received as a whole by the at least one input measurement point and number of packets received as a whole by the at least one output measurement point.

Preferably, at step d) said providing the performance measurement comprises calculating an average round-trip delay for the cluster by:
- calculating a first average one-way delay for the cluster in a first direction and a second average one-way delay for the cluster in a second direction opposite to the first direction; and
- calculating the average round-trip delay as a sum of the first average one-way delay and the second average one-way delay.

Preferably, step d) comprises providing at least one statistical performance measurement of the multipoint packet flow along an end-to-end path of the monitoring network by:
- identifying K cascaded clusters of the monitoring network which are crossed by the end-to-end path, K being equal to or higher than 2; and
- providing the at least one statistical performance measurement using performance measurements provided for said K cascaded clusters.

Preferably, providing the statistical performance measurement comprises providing a statistical packet loss measurement for the end-to-end path by:
- calculating a cumulative packet loss probability of the K cascaded clusters as a function of packet losses probabilities of the K cascaded clusters; and
- calculating said statistical packet loss measurement for the end-to-end path as a function of said cumulative packet loss probability and a number of packets received at a measurement point terminating the end-to-end path.

Preferably, providing said statistical performance measurement comprises providing a statistical average one-way delay measurement for the end-to-end path by:
- calculating said statistical average one-way delay measurement for said end-to-end path as a summation of average one-way delays of said K cascaded clusters.

According to a second aspect, the present invention provides a packet-switched communication network comprising:
- a subnetwork configured to support transmission of a multipoint packet flow, each packet of the multipoint packet flow comprising a marking field set to a marking value equal to either a first marking value or a second marking value, the marking value being periodically switched between the first marking value and the second marking value;
- a monitoring network comprising a plurality of measurement points implemented in the subnetwork, each measurement point being configured to receive at least one of the marked packets and, if the at least one of the marked packets is marked by the first marking value, update a performance parameter; and
- a management server configured to provide a performance measurement on the multipoint packet flow, the management server being configured to:
  - identify in the monitoring network a cluster of measurement points, the cluster of measurement points being a set of measurement points of the monitoring network selected so that, if no packet loss occurs, each packet received by at least one input measurement point of the cluster is also received at at least one output measurement point of the cluster; and
  - provide the performance measurement on the multipoint packet flow using performance parameters gathered from the at least one input measurement point and the at least one output measurement point of the cluster.

According to a third aspect, the present invention provides a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
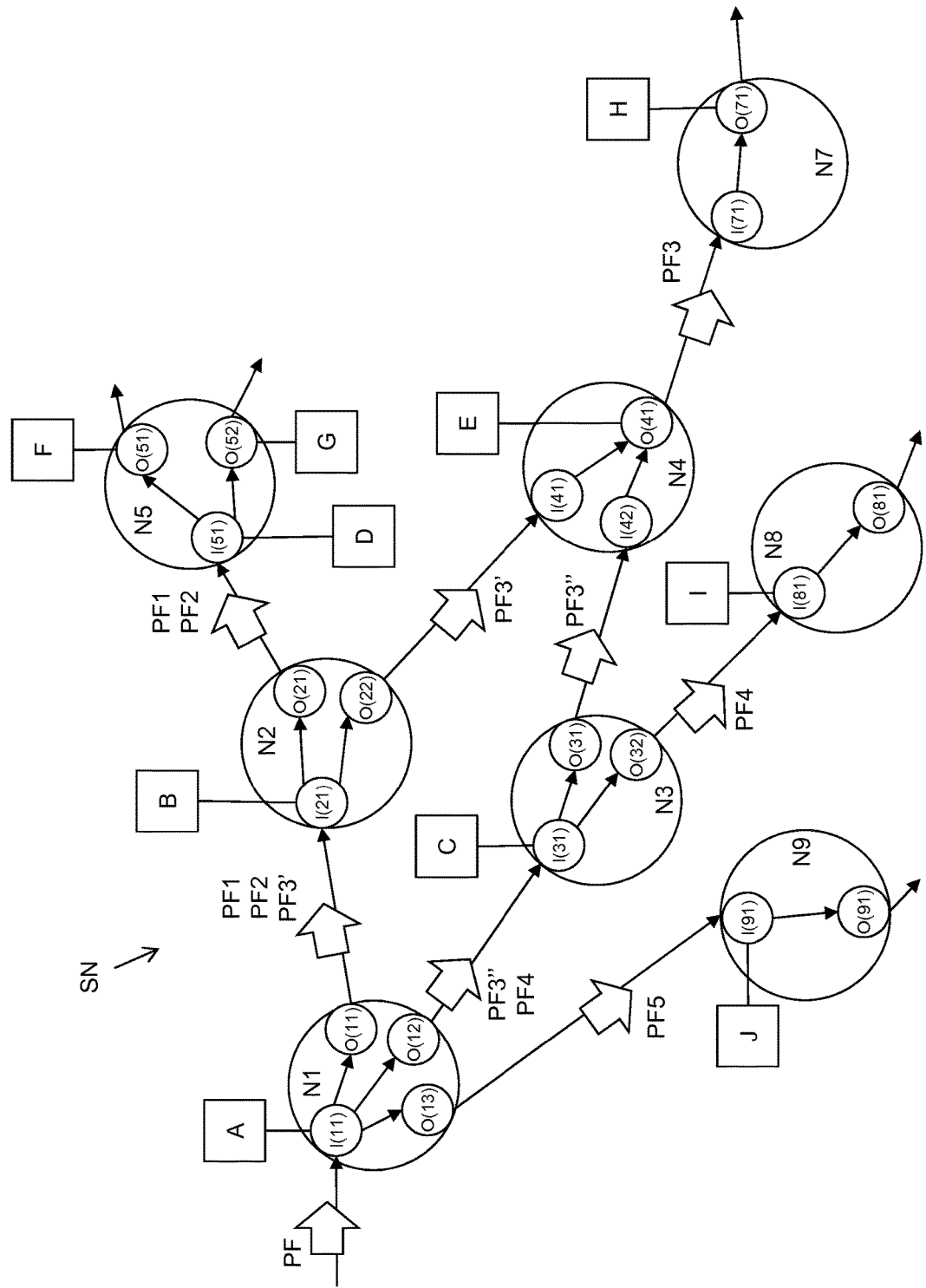
FIG. 1 schematically shows an exemplary subnetwork supporting transmission of a multipoint packet flow.

FIG. 1 schematically shows an exemplary subnetwork SN supporting transmission of a multipoint packet flow PF, in which the method for performing a performance measurement according to embodiments of the present invention is implemented. The subnetwork network SN may be part of an IP network or any other type of packet-switched network (e.g. MPLS or Ethernet).

The subnetwork SN comprises a plurality of nodes reciprocally interconnected by links according to any known topology. In particular, the subnetwork SN comprises nodes N1, N2, ..., N5, N7, N8, N9 which, by way of non limiting example, are reciprocally interconnected according to a partially meshed topology. In particular, node N1 is connected to N2, N3 and N9, node N2 is connected to N4 and N5, node N3 is connected to N4 and N8, node N4 is connected to N7.

Each node N1, N2, ..., N5, N7, N8, N9 preferably comprises at least one input interface and at least one output interface. The input and output interfaces of the nodes N1, N2, ..., N5, N7, N8, N9 are reciprocally interconnected by physical links. By way of non limiting example, as shown in FIG. 1:

N1 comprises an input interface I(11), a first output interface O(11) connected to an input interface I(21) of N2, a second output interface O(12) connected to an input interface I(31) of N3 and a third output interface O(13) connected to an input interface I(91) of N9;

N2 comprises a first output interface O(21) connected to an input interface I(51) of N5 and a second output interface O(22) connected to an input interface I(41) of N4;

N3 comprises a first output interface O(31) connected to an input interface I(42) of N4 and a second output interface O(32) connected to an input interface I(81) of N8;

N4 comprises an output interface O(41) connected to an input interface I(71) of N7;

N5 comprises two output interfaces O(51), O(52); and

N7, N8 and N9 comprise respective output interfaces O(71), O(81) and O(91).

The subnetwork SN supports transmission of a multipoint packet flow PF.

The multipoint packet flow PF may comprise K point-to-point packet flows originated by N=1 source node and addressed to M>1 destination nodes. This is the case of the exemplary scenario depicted in FIG. 1, where the packet flow PF comprises K=5 point-to-point packet flows PF1, PF2, ... PF5 having N=1 source node N1 and M=4 destination nodes N5, N7, N8 and N9. In particular, PF1 and PF2 are addressed to N5, PF3 is addressed to N7, PF4 is addressed to N8 and PF5 is addressed to N9.

Alternatively, the multipoint packet flow PF may have N>1 source nodes and M=1 destination node. This is the case of the exemplary scenario depicted in FIG. 2a, where nodes N1, N2, N3 are three source nodes and N7 is the unique destination node.

Alternatively, the multipoint packet flow PF may have N>1 source nodes and M>1 destination nodes. This is the case of the exemplary scenario depicted in FIG. 2b, where nodes N1, N2, N3 are three source nodes, while N6 and N7 are two destination nodes. In this case, the multipoint packet flow PF may have few source nodes and several destination nodes, namely N<<M. This is the case e.g. of multipoint packet flows carrying traffic of an OTT internet service in the downstream direction, namely from few OTT servers to multiple end users, or those carrying LTE (Long Term Evolution) traffic in the downstream direction, namely from few packet gateways to several eNodeBs. Alternatively, the multipoint packet flow PF may have several source nodes and few destination nodes, namely N>>M. This is the case e.g. of multipoint packet flows carrying traffic of an OTT internet service in the upstream direction, namely from multiple end users to few OTT servers, or those carrying LTE traffic in the upstream direction, namely from several eNodeBs to few packet gateways.

Alternatively, the multipoint packet flow PF may have N=1 source node and M=1 destination node, but follow different paths through the subnetwork SN. This is the case of the exemplary scenario depicted in FIG. 2c, where N1 is the unique source node, N5 is the unique destination node.

By referring again to the exemplary scenario of FIG. 1, the multipoint packet flow PF as a whole is injected in the subnetwork SN via the input interface I(11) of the source node N1 and is then split. In particular, by way of non limiting example, PF1, PF2 and first portion PF3' of the packet flow PF3 are transmitted by N1 to N2, while another portion PF3" of the packet flow PF3 together with PF4 are transmitted from N1 to N3 and PF5 is transmitted to N9. At the node N2, PF1, PF2 and the first portion PF3' of the packet flow PF3 are further split, namely PF1 and PF2 are transmitted to N5, while PF3' is transmitted to N4. At the node N3, PF3" and PF4 are further split, namely PF3" is transmitted to N4, while PF4 is transmitted to N8. At the node N4, the portions PF3' and PF3" are joined and forwarded to N7. At the node N5, the packet flow PF1 and PF2 are further split, namely PF1 is transmitted to the output interface O(51) and PF2 is transmitted to the output interface O(52).

Figure 3:
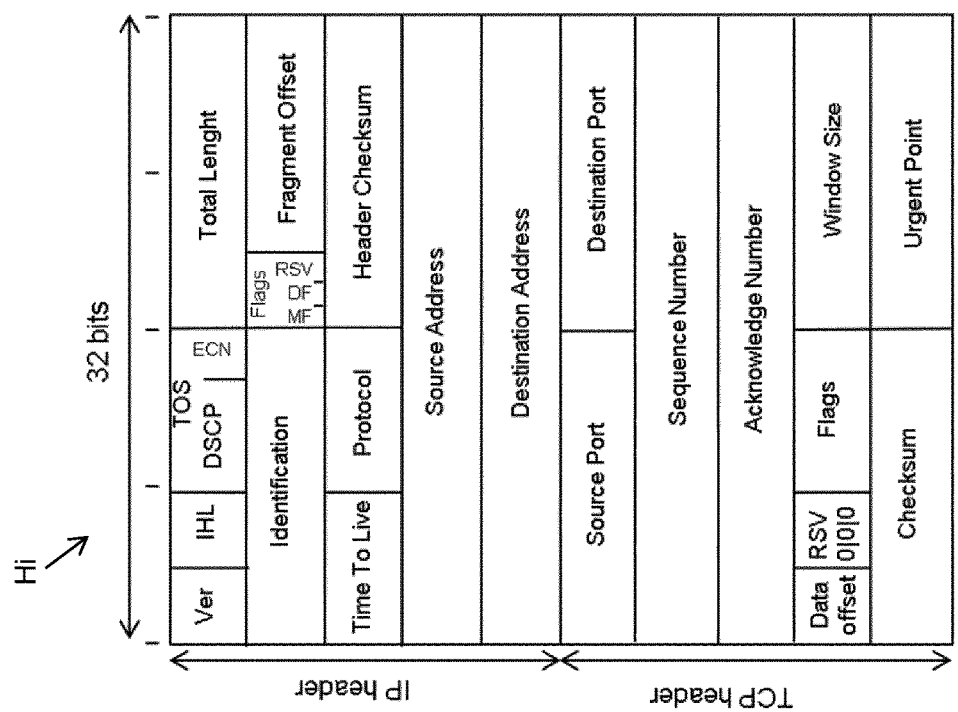
FIG. 3 shown the structure of the header of a packet formatted according to the known TCP over IPv4 protocol.

Preferably, each packet of the multipoint packet flow PF comprises a header and a payload. The payload comprises user data. Preferably, the header comprises information for routing the packet. The header format depends on the protocol according to which the packets are formatted. By way of non limiting example, FIG. 3 shows the header Hi of a packet formatted according to the known TCP (Transmission Control Protocol) over IPv4 (Internet Protocol Version 4). The header Hi comprises 40 bytes divided into 20 bytes for the IP header and 20 bytes for the TCP header.

Preferably, the multipoint packet flow PF is defined (and hence distinguishable amongst all the traffic transmitted in the communication network CN) by one or more values of one or more of the above header fields, which are termed herein after "identification fields". In particular, in case of IPv4 protocol, the identification fields may comprise one or more of: Source Address, Destination Address, Protocol and DSCP of the IP header and Source Port and Destination Port of the TCP header. By suitably selecting the identification fields and their values, different types of multipoint packet flows may be defined.

For instance, the multipoint packet flow PF of the scenario shown in FIG. 1 may be defined either by a single value of the Source Address field (namely, the IP address of host devices directly or indirectly connected to the source node N1) or by a set of values of the Destination Address field (namely, the IP addresses of host devices directly or indirectly connected to the destination nodes N5, N7, N8 and N9).

Figure 2:
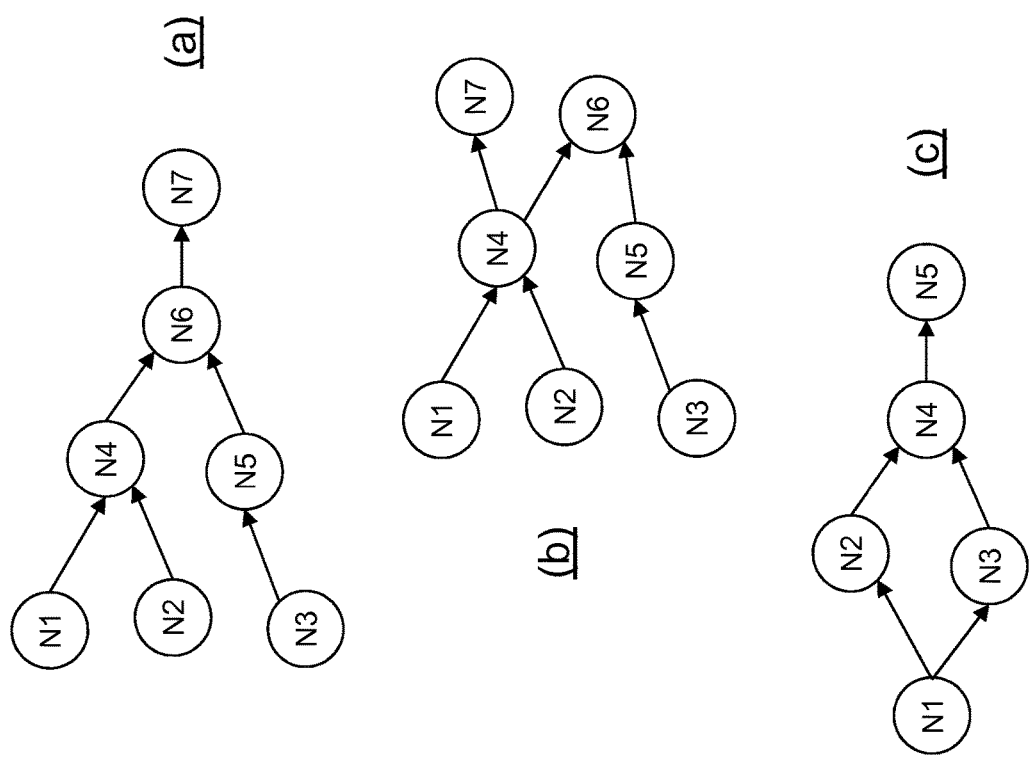
FIG. 2 schematically show alternative subnetworks supporting transmission of other multipoint packet flows.

In general, defining a multipoint packet flow by a single value of the Source Address field results in a multipoint packet flow having N=1 source node (as PF in FIG. 1), defining a multipoint packet flow by a single value of the Destination Address field results in a multipoint packet flow having M=1 destination node (see FIG. 2a), defining a multipoint packet flow by multiple values of the Source Address field and/or multiple values of the Destination Address field results in a multipoint packet flow with N>1 source nodes and M>1 destination nodes (see FIG. 2b), while defining a multipoint packet flow by a single value of the Source Address field and a single value of the Destination Address field results is a multipoint packet flow having N=1 source node and M=1 destination node (see FIG. 2c).

Preferably, a monitoring network MN comprising a plurality of measurement points is implemented in the subnetwork SN. Each measurement point may be either embedded within a respective node, or implemented as a stand-alone machine connected to a respective node.

The monitoring network MN may comprise a measurement point at each one of the N source nodes and a measurement point at each one of the M destination nodes. For instance, with reference to FIG. 1, a measurement point A is implemented at the source node N1 (in particular on its input interface I(11)) and measurement points F, G, H, I, J are implemented at the destination nodes N5, N7, N8, N9 (in particular, at their interfaces O(51), O(52), O(71), I(81) and I(91), respectively).

The monitoring network MN may also comprise one or more measurement points implemented at the intermediate nodes of the subnetwork SN. For instance, with reference to the exemplary scenario of FIG. 1:
- a measurement point B is implemented at the input interface I(21) of N2, where PF1, PF2 and PF3' are split;
- a measurement point C is implemented at the input interface I(31) of N3, where PF3" and PF4 are split;
- a measurement point D is implemented at the input interface I(51) of N5, where PF1 and PF2 are split; and
- a measurement point E is implemented at the output interface O(41) of N4, where PF3' and PF3" are joined.

It may be appreciated that this arrangement of the measurement points is purely exemplary. The performance measurement method of the present invention is indeed advantageously capable of providing consistent results with any arrangement of the measurement points.

Figure 4:
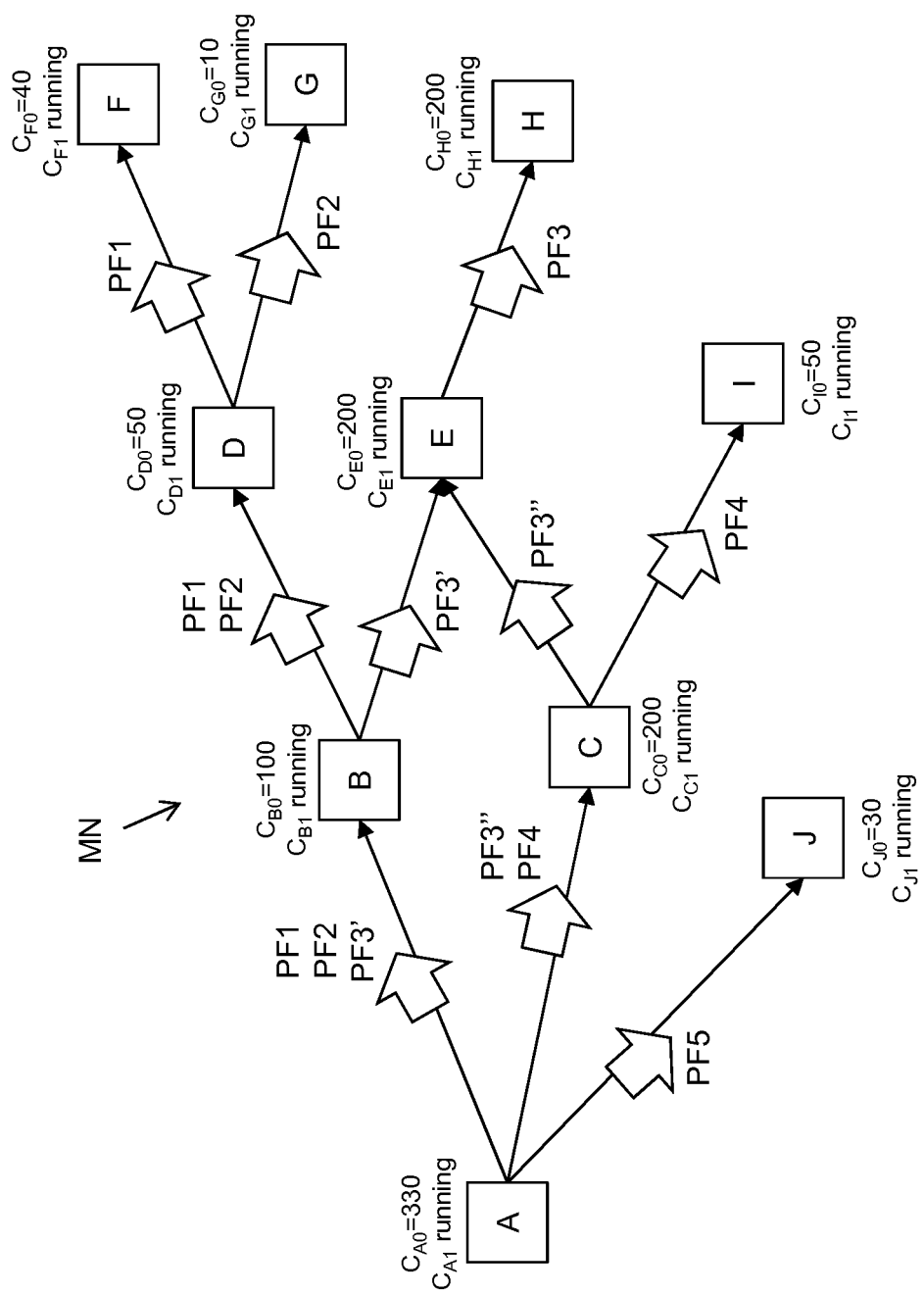
FIG. 4 shows a monitoring network of measurement points implemented in the subnetwork of FIG. 1.

FIG. 4 shows the monitoring network MN comprising the measurement points A, B, . . . J, the measurement points being reciprocally interconnected by logical links.

Preferably, the monitoring network MN is also provided with a management server, which is not shown in FIG. 4 for simplicity. The management server may be either a standalone server connected to any of the nodes. Alternatively, the management server may be implemented at any of the nodes. The management server preferably cooperates with the measurement points of the monitoring network MN for gathering therefrom performance parameters, as it will be described in detail herein after.

According to preferred embodiments of the present invention, the packets of the multipoint packet flow PF are marked before they are injected in the subnetwork SN via the N source nodes. The marking may be implemented at the N source nodes themselves. In this case, the packets are preferably marked before they are received by the measurement points implemented at the N source nodes. Alternatively, the packets of the multipoint packet flow PF may be marked upstream the N source nodes.

More particularly, each packet of the multipoint packet flow PF preferably includes a marking field MF comprising at least one bit, whose value is set to one of two alternative marking values V0, V1. The marking field MF is preferably comprised in the packet header Hi. The marking field MF may be for instance a field to which the protocol according to which the packet is formatted has not assigned a specific function yet. Alternatively, the marking field MF may be comprised in a field having other uses. For instance, in case of IP packets (see FIG. 3), the marking field MF may comprise one bit of the 8-bit TOS (Type of Service) field or the RSV bit of the Flags field, and its two alternative marking values V1 and V0 may be 1 and 0, respectively.

The value of the marking field MF is periodically switched between V1 and V0 with a period Tb, which will be termed herein after "marking period". The marking period Tb may be set by the network operator, according to the desired time measurement rate (as it will be described in detail herein after, the marking period Tb is also the measurement period). For instance, the marking period Tb may be equal to 5 minutes.

The marking of all the K point-to-point packet flows of the multipoint packet flow PF is substantially synchronized, namely the marking value is changed substantially at the same time (namely, with a maximum mismatch of Tb/2) for all the K point-to-point packet flows of the multipoint packet flow PF. This way, the packets of the multipoint packet flow PF which are transmitted during a certain marking period are substantially all marked with a same marking value V1 or V0.

Each measurement point of the monitoring network MN is preferably configured to provide at least one couple of performance parameters, one relating to packets marked by V1 and the other one relating to packets marked by V0, as it will be described in detail herein after with reference to the flow chart of FIG. 5.

During each marking period, each measurement point X (X=A, B, . . . J) receives all the traffic (or a copy thereof) received at the node input or output interface at which it is implemented (step 500).

The measurement point X then filters all the incoming traffic, in order to identify the packets of the multipoint packet flow PF (step 501). In order to perform the filtering step 501, the measurement point X preferably reads the value(s) of the identification field(s) comprised in the header Hi of each received packet and checks whether it is (they are) equal to that one or those ones which define the multipoint packet flow PF as described above. Assuming that the packet flow PF shown in the exemplary scenario of FIG. 1 is defined by the value of the IP address of the source node N1, at step 501 each measurement point X preferably checks whether the Source Address of each incoming packet is equal to such value. Then, each measurement point X preferably reads the marking value V1 or V0 comprised in the marking field MF of each identified packet (step 502).

Then, depending on whether the packet is marked by V1 or V0, each measurement point X updates the value of the relevant performance parameter (step 503). Since—during each marking period—only packets with a same marking value are transmitted (e.g. V1), iterations of step 503 during that marking period result in the performance parameter relating to packets with that marking value (e.g. V1) being updated and the performance parameter relating to packets marked with the other marking value (e.g. V0) being fixed to the value reached at the end of the preceding marking period.

Hence, upon expiration of each marking period (step 504), each measurement point X preferably sends to the management server the value which the performance parameter updated during the expired marking period reached at the end thereof (step 505). The management server will then use the currently fixed performance parameters gathered by the measurement points is order to provide a performance measurement of the multipoint packet flow PF.

In order to provide a performance measurement on the multipoint packet flow PF, at least one cluster of measurement points is preferably identified in the monitoring network MN. A cluster is preferably defined as a set of measurement points of the monitoring network MN which exhibits the property that the ensemble of the packets received at the input measurement point(s) of the cluster is the same as the ensemble of the packets received at the output measurement point(s) of the cluster, if no packet loss occurs.

Several clusters of different sizes may be identified in the monitoring network MN.

Figure 6:
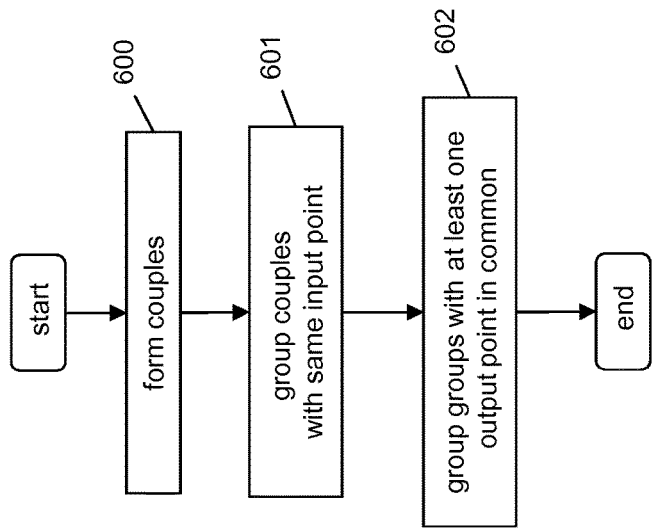
FIG. 6 is a flow chart of a method for identifying a cluster of measurement points in a monitoring network of measurement points.

According to a preferred embodiment, first clusters of the monitoring network MN are identified by applying the algorithm shown in FIG. 6.

Firstly, preferably, all the couples of measurement points (X→Y) connected by a virtual link are identified (step 600).

In the exemplary monitoring network MN of FIG. 4, the following couples are then identified at step 600: (A→B), (A→C), (A→J), (B→D), (B→E), (C→E), (C→I), (D→F), (D→G), (E→H).

Then, preferably, all the couples having the same originating measurement point are grouped (step 601). Hence, in the exemplary monitoring network MN of FIG. 4, the couples (A→B), (A→C), (A→J) are grouped, the couples (B→D), (B→E) are grouped, the couples (C→E), (C→I) are grouped and the couples (D→F), (D→G) are grouped.

Then, preferably, all the groups of couples having at least one terminating measurement point in common are preferably further grouped (step 602). Hence, in the exemplary monitoring network MN of FIG. 4, the group of couples (B→D), (B→E) and the group of couples (C→E), (C→I) are further grouped, having the terminating measurement point E in common. The groups resulting from step 602 are elementary or minimum-sized clusters of the monitoring network MN.

Figure 7B:
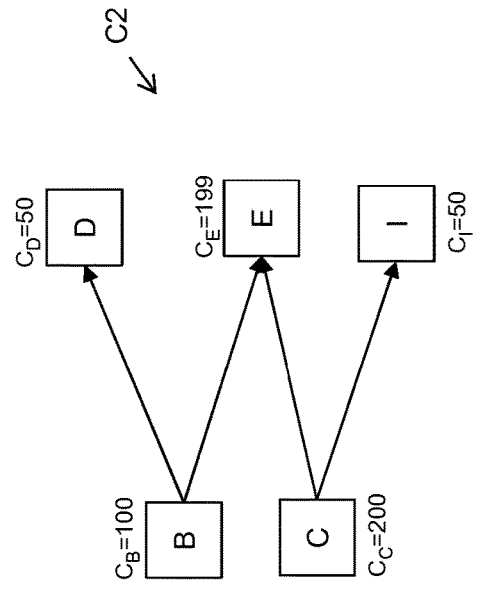
FIGS. 7a, 7b, 7c and 7d show the clusters of the monitoring network of FIG. 4 identified by applying the method of FIG. 6.
Figure 7D:
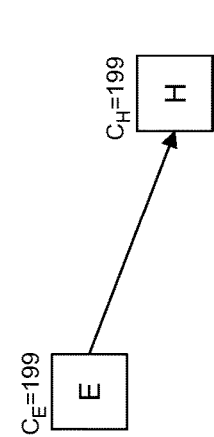
Figure 7A:
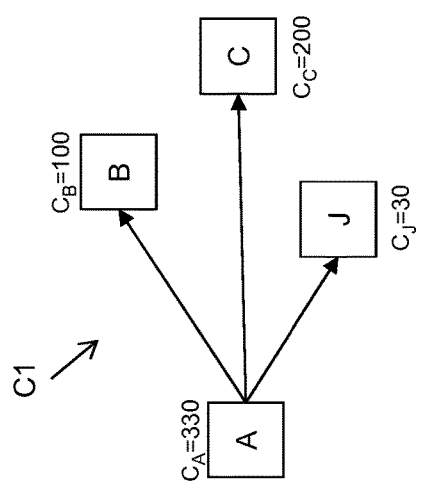
Figure 7C:
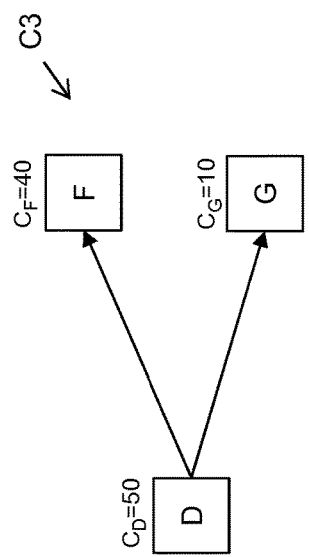

Application of the above algorithm to the exemplary monitoring network MN of FIG. 4 therefore allows identifying four clusters:
- cluster C1 (FIG. 7a) comprising A as input measurement point and B, C and J as output measurement points;
- cluster C2 (FIG. 7b) comprising B and C as input measurement points and D, E and I as output measurement points;
- cluster C3 (FIG. 7c) comprising D as input measurement point and F, G as output measurement points; and
- cluster C4 (FIG. 7d) comprising E as input measurement point and H as output measurement point.

Even if all the above clusters only comprise input measurement points and output measurement points, execution of the algorithm of FIG. 6 may lead to identification of a cluster comprising also intermediate measurement points.

Further, two or more adjacent minimum-sized clusters identified as described above may be grouped into further larger clusters, which still exhibit the above cluster property. If the monitoring network MN comprises a measurement point at each one of the N source nodes and a measurement point at each one of the M destination nodes (as depicted in FIG. 1, by way of non limiting example), the largest cluster is the monitoring network MN itself, which is provided by grouping all its minimum-sized clusters identified as described above.

Since, for each cluster, the ensemble of the packets received at the input measurement point(s) is the same as the ensemble of the packets received at the output measurement point(s) (if no packet loss occurs), then the ensemble of the couples of performance parameters provided by the input measurement point(s) of each cluster is advantageously commensurable with the ensemble of the couples of performance parameters provided by the output measurement point(s) of the same cluster.

Hence, at the end of each marking period, the performance parameters relating to packets transmitted during the last marking period (and therefore having a same marking value) and provided by all the input and output measurement points of a cluster may be combined to provide a performance measurement of the multipoint packet flow PF during the last marking period in the cluster.

Herein after, only the monitoring network MN as a whole and its minimum-sized cluster (also termed simply "clusters") identified e.g. by the algorithm of FIG. 6 will be considered. However, every consideration relating to the monitoring network MN as a whole and its clusters is straightforwardly applicable to any intermediate-sized cluster obtained by grouping two or more minimum-sized clusters.

A first type of performance measurements which may be provided for the multipoint packet flow PF according to embodiments of the present invention are packet loss measurements, namely measurements of the number of packets of the multipoint packet flow PF lost during transmission.

In order to enable packet loss measurements, the couple of performance parameters implemented by each measurement point X (X=A, B, . . . J) preferably is a couple of counters $C_{X0}$, $C_{X1}$ (X=A, B . . . J), one for counting packets marked by V0 and one for counting packet marked by V1. In particular, during step 503 of the flow chart of FIG. 5, upon reception of a packet of the multipoint packet flow PF marked by V0, the measurement point X preferably increases the counter $C_{X0}$ by 1 whereas, upon reception of a packet of the multipoint packet flow PF marked by V1, the measurement point X preferably increases the counter $C_{X1}$ by 1. Hence, during marking periods wherein packets are marked by V0, the counter $C_{X1}$ at each measurement point X has a fixed value indicative of the number of packets marked by V1 received at the measurement point X during the preceding marking period, while the counter $C_{X0}$ is increased upon reception of each packet marked by V0. Similarly, during marking periods wherein packets are marked by V1, the counter $C_{X0}$ at each measurement point X has a fixed value indicative of the number of packets marked by V0 received at the measurement point X during the preceding marking period, while the counter $C_{X1}$ is increased upon reception of each packet marked by V1. This latter case is depicted in FIG. 4, which shows exemplary values of the counters $C_{X0}$ (x=A, B, . . . J) as provided by the measurement points A, B, C, . . . J, during a marking period wherein packets of the multipoint packet flow PF are marked by V1.

Then, an overall packet loss $PL_{OV}$ of the multipoint packet flow PF may be calculated for that marking period as:

$$PL_{OV}=C_{OV}^{in}-C_{OV}^{out} \quad [1]$$

wherein:
(i) $C_{OV}^{in}$ is the summation of the N counters provided by the N input measurement points of the monitoring network MN as a whole at the end of that marking period, and
(ii) $C_{OV}^{out}$ is the summation of the M counters provided by the M output measurement points of the monitoring network MN as a whole at the end of that marking period.

In the exemplary monitoring network MN of FIG. 4, $C_{OV}^{in}=C_A$ and $C_{OV}^{out}=C_F+C_G+C_H+C_I+C_J$, where $C_x$ (X=A, F, G, I, J) is equal to $C_{X0}$ for marking periods wherein packets were marked by V0 and to $C_{X1}$ marking periods wherein packets were marked by V1.

It may be appreciated that application of equation [1] to the exemplary values of $C_{X0}$ set forth in FIG. 4 results in $PL_{OV}=0$, meaning that no packet loss occurred during the last marking period. Besides, a resulting $PL_{OV}$ different from 0 would be indicative of a packet loss occurring in the last marking period.

The overall packet loss measurement $PL_{OV}$ provides an overall indication of the performance of the multipoint packet flow PF in the subnetwork SN as a whole. However, if a packet loss occurs during a marking period, the measurement of $PL_{OV}$ does not provide any indication of the physical link(s) or node(s) at which the packet loss occurred.

According to embodiments of the present invention, a cluster packet loss is also calculated for each cluster of the monitoring network MN. In particular, the cluster packet loss $PL_{Ci}$ for a cluster Ci (i being the cluster index) and for a marking period is preferably calculated as:

$$PL_{Ci}=C_i^{in}-C_i^{out} \quad [2]$$

wherein:
(i) $C_i^{in}$ is the summation of the counters provided by the input measurement points of cluster Ci at the end of that marking period and
(ii) $C_i^{out}$ is the summation of the counters provided by the output measurement points of cluster Ci at the end of that marking period.

Hence, in the exemplary monitoring network MN of FIG. 4, at the end of a marking period the following cluster packet losses are provided by applying equation [2]:

$$PL_{C1}=C_1^{in}-C_1^{out}=C_A-(C_B+C_C+C_J);$$

$$PL_{C2}=C_2^{in}-C_2^{out}=(C_B+C_C)-(C_D+C_E+C_I);$$

$$PL_{C3}=C_3^{in}-C_3^{out}=C_D-(C_F+C_G); \text{ and}$$

$$PL_{C4}=C_4^{in}-C_4^{out}=C_E-C_H,$$

where $C_X$ (X=A, B, . . . J) is equal to $C_{X0}$ for marking periods wherein packets were marked by V0 and to $C_{X1}$ marking periods wherein packets were marked by V1.

Cluster packet loss measurements allow locating more precisely a packet loss occurring in the subnetwork SN supporting transmission of the multipoint packet flow PF.

Assuming for instance that, at the end of a marking period, the values of the counters $C_x$ provided by the various measurement points are those shown in FIGS. 7a, 7b, 7c and 7d, the overall packet loss $PL_{OV}$ calculated as described above by applying equation [1] results in $PL_{OV}=1$, indicating that a packet loss occurred in the subnetwork SN. In order to locate more precisely the packet loss within the subnetwork SN, the cluster packet losses are calculated applying equation [2] to each cluster C1, C2, C3, C4, which provide $PL_{C1}=PL_{C3}=PL_{C4}=0$ (meaning that no packet loss occurred in the last marking period in clusters C1, C3 and C4) and $PL_{C2}=1$, meaning that the packet loss occurred in cluster C2.

If the cluster Ci with cluster packet loss $PL_{Ci}$ different from 0 comprises a single virtual link, the above cluster packet loss measurement allows identifying exactly the physical link or node of the subnetwork SN on which the packet loss occurred.

If, instead, the cluster Ci comprises more than one virtual link, it is not possible to determine exactly on which virtual link(s) of the cluster Ci the packet loss occurred. In this case, a packet loss probability $PLP_{Ci}$ of the cluster Ci may be calculated as the cluster packet loss $PL_{Ci}$ divided by $C_i^{in}$ (namely, the summation of the counters provided by the input measurement points of cluster Ci), namely:

$$PLP_{Ci} = \frac{PL_{Ci}}{C_i^{in}} \quad [3]$$

By applying equation [3] to clusters C1, C2, C3, C4 using the exemplary counter values shown in FIGS. 7a, 7b, 7c and 7d, it follows that $PLP_{C1}=PLP_{C3}=PLP_{C4}=0$, while $PLP_{C2}=1/(100+200)=0.00333$. This means that a packet transmitted though cluster C2 has a probability of 0.00333 of being lost, namely a packet every 300 is lost.

Under the assumption that each virtual link of a cluster Ci has a packet loss probability equal to the packet loss probability $PLP_{Ci}$ of the cluster Ci, a statistical link packet loss may be calculated for each virtual link (X→Y) of the cluster Ci, by distributing the packet loss $PL_{Ci}$ of the cluster Ci on the various virtual links proportionally to the number of packets received at the measurement point terminating each virtual link.

More particularly, according to embodiments of the present invention, the statistical link packet loss $PL_{(Y)}$ for a virtual link originating at the measurement point X and terminating at the measurement point Y of cluster Ci is calculated as follows:

$$PL_{(Y)} = C_{(X \to Y)} - C_Y \quad [4]$$

where $C_Y$ is the counter provided by the measurement point Y terminating the virtual link and $C_{(X \to Y)}$ is the number of packets statistically received at the measurement point X and transmitted over the virtual link (X→Y). However, $C_Y$ equals the number $C_{(X \to Y)}$ of packets transmitted over the virtual link (X→Y) minus the packets statistically lost over the virtual link (X→Y), i.e. $C_{(X \to Y)}$ multiplied by $PLP_{Ci}$ (the packet loss probability for the cluster Ci), namely:

$$C_Y = C_{(X \to Y)} - C_{(X \to Y)} PLP_{Ci} = C_{(X \to Y)}(1 - PLP_{Ci}).$$

Accordingly, the number of packets $C_{(X \to Y)}$ transmitted over the virtual link (X→Y) is equal to $C_Y$ divided by $(1 - PLP_{Ci})$. Hence, equation [4] may be rewritten as follows:

$$PL_{(Y)} = C_{(X \to Y)} - C_Y = \frac{C_Y}{(1 - PLP_{Ci})} - C_Y = C_Y \cdot \frac{PLP_{Ci}}{1 - PLP_{Ci}} \quad [4]$$

By applying the above equation [4] to each one of the virtual links of cluster C2 using the exemplary counter values shown in FIGS. 7a, 7b, 7c and 7d, the following statistical link packet losses are obtained:

$$PL_{(D)} = \frac{50}{1 - \frac{1}{300}} - 50 = \frac{50}{(1 - 0.00333)} - 50 = 50.167 - 50 = 0.167;$$

$$PL_{(E)} = \frac{199}{1 - \frac{1}{300}} - 199 = \frac{199}{(1 - 0.00333)} - 199 = 199.66 - 199 = 0.666;$$

$$PL_{(I)} = \frac{50}{1 - \frac{1}{300}} - 50 = \frac{50}{(1 - 0.00333)} - 50 = 50.167 - 50 = 0.167.$$

It may be appreciated that the summation of the statistical link packet losses of all the virtual links of the cluster C2 equals the cluster packet loss $PL_{C2}$.

Moreover, according to embodiments of the present invention, a statistical end-to-end packet loss $PL_{(W \to Z)}$ may be calculated for each end-to-end path (W→Z) originating at a measurement point W implemented at one of the N source nodes and terminated at a measurement point Z implemented at one of the M destination nodes.

To this purpose, the cluster(s) crossed by each end-to-end path (W→Z) in the monitoring network MN are preferably identified. With reference to the exemplary monitoring network of FIG. 4:

path A→F: C1→C2→C3;
path A→G: C1→C2→C3;
path A→H: C1→C2→C4;
path A→I: C1→C2; and
path A→J: C1.

Then, a packet loss probability is preferably calculated for the cascade of clusters crossed by each end-to-end path. In particular, the packet loss probability of the cascade of K clusters is preferably calculated as:

$$PLP_{(K\ clusters)} = 1 - \prod_{k=1}^{K}(1 - PLP_{Ck}) \quad [5]$$

where $PLP_{Ck}$ is the packet loss probability of the $k^{th}$ cluster.

Hence, by applying equation [5] to the exemplary counter values shown in FIGS. 7a, 7b, 7c and 7d, the following end-to-end packet loss probabilities are provided:

$PLP_{(A \to F)} = PLP_{C1,C2,C3} = 1 - [(1-0)(1-0.00333)(1-0)] = 0.00333;$
$PLP_{(A \to G)} = PLP_{C1,C2,C3} = 1 - [(1-0)(1-0.00333)(1-0)] = 0.00333;$
$PLP_{(A \to H)} = PLP_{C1,C2,C4} = 1 - [(1-0)(1-0.00333)(1-0)] = 0.00333;$
$PLP_{(A \to I)} = PLP_{C1,C2} = 1 - [(1-0)(1-0.00333)] = 0.00333;$
$PLP_{(A \to J)} = PLP_{C1} = 1 - [(1-0)] = 0.$

Then, the statistical end-to-end packet loss $PL_{(W \to Z)}$ is preferably calculated for the end-to-end path (W→Z) as:

$$PL_{(W \to Z)} = C_{(W \to Z)} - C_Z = \frac{C_Z}{(1 - PLP_{(W \to Z)})} - C_Z = C_Z \cdot \frac{PLP_{(W \to Z)}}{1 - PLP_{(W \to Z)}}, \quad [6]$$

where $C_Z$ is the counter provided by the measurement point Z terminating the end-to-end path and $C_{(W \to Z)}$ is the number of packets statistically received at the measurement point W and transmitted over the end-to-end path (W→Z), which is equal to $C_z$ divided by $(1 - PLP_{(W \to Z)})$.

By applying equation [6] to each one of the end-to-end paths of the exemplary monitoring network MN of FIG. 4 using the exemplary counter values shown in FIGS. 7a, 7b, 7c and 7d, the following statistical end-to-end packet losses are obtained:

$$PL_{(A \to F)} = \frac{40}{(1 - 0.00333)} - 40 = 40.134 - 40 = 0.134;$$

$$PL_{(A \to G)} = \frac{10}{(1 - 0.00333)} - 10 = 10.033 - 10 = 0.033;$$

$$PL_{(A \to H)} = \frac{199}{(1 - 0.00333)} - 199 = 199.666 - 199 = 0.666;$$

$$PL_{(A \to I)} = \frac{50}{(1 - 0.00333)} - 50 = 50.167 - 50 = 0.167;\ \text{and}$$

$$PL_{(A \to J)} = \frac{30}{(1 - 0)} - 30 = 0.$$

It shall be noticed that the summation of the statistical end-to-end packet losses for the various end-to-end links calculated as described above equals the overall packet loss $PL_{OV} = 1$.

Besides packet loss measurements, also time measurements may be advantageously performed on the multipoint packet flow PF.

In order to enable this type of performance measurements, each measurement point X (X=A, B, . . . J) preferably implements not only a couple of counters $C_{X0}$, $C_{X1}$ (X=A, B . . . J), but also a couple of average timestamps $T_{X0}$, $T_{X1}$ (X=A, B . . . J), one relating to packets marked by V0 and one relating to packets marked by V1.

In particular, during step 503, upon reception of a packet of the multipoint packet flow PF marked by V0, the measurement point X preferably increases the counter $C_{X0}$ by 1, generates a timestamp indicating the time at which the packet has been received and uses this timestamp for updating the average timestamps $T_{X0}$, which is the summation of all the timestamps generated for packets marked by V0 already received in current marking period divided by $C_{X0}$. Similarly, upon reception of a packet of the multipoint packet flow PF marked by V1, the measurement point X preferably increases the counter $C_{X1}$ by 1, generates a timestamp indicating the time at which the packet has been received and uses this timestamp for updating the average timestamps $T_{X1}$, which is the summation of all the timestamps generated for packets marked by V1 already received in current marking period divided by $C_{X1}$.

Figure 8:
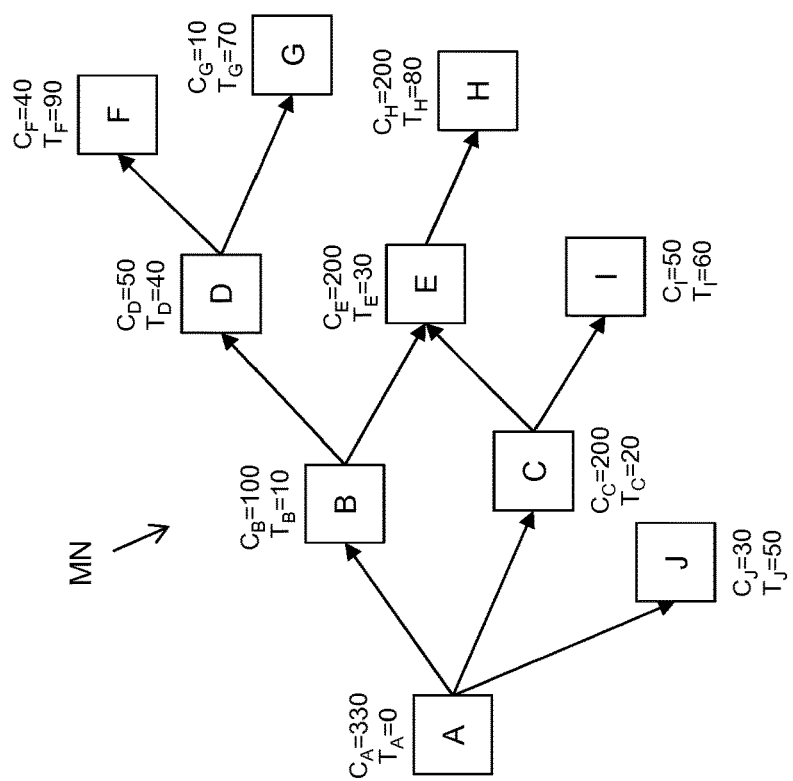
FIG. 8 shows the monitoring network of FIG. 4 with exemplary values of counters and average timestamps.

Hence, during marking periods wherein packets are marked by V0, the counter $C_{X1}$ and the average timestamp $T_{X1}$ at each measurement point X have fixed values, while the counter $C_{X0}$ and the average timestamp $T_{X0}$ are updated upon reception of each packet marked by V0. Similarly, during marking periods wherein packets are marked by V1, the counter $C_{X0}$ and the average timestamp $T_{X0}$ at each measurement point X have fixed values, while the counter $C_{X1}$ and the average timestamp $T_{X1}$ are updated upon reception of each packet marked by V1. This latter case is depicted in FIG. 8, which shows exemplary values of the counters $C_X$ and average timestamps $T_x$ (x=A, B, ... J) as provided by the measurement points A, B, C, ... J in the exemplary monitoring network MN of FIG. 4, at the end of a marking period. The unit of measurement for the average timestamps is milliseconds.

Under the assumption that all the measurement points have substantially synchronized clocks, a first performance measurement which may be done is an overall average one-way delay $OWD_{OV}$ for the multipoint packet flow PF from the N source nodes to the M destination nodes in a certain marking period. The overall average one-way delay $OWD_{OV}$ for a marking period is preferably calculated as $$OWD_{OV} = T_{OV}^{out} - T_{OV}^{in} = \frac{\sum_{k=1}^{M} C_k T_{ki}}{\sum_{k=1}^{M} C_k} - \frac{\sum_{j=1}^{N} C_j T_j}{\sum_{j=1}^{N} C_j} \qquad [7]$$

wherein:
(i) $C_k$ and $T_k$ (i=1, ... M) are the counters and average timestamps provided by the M output measurement points of the monitoring network MN as a whole at the end of the last marking period; and
(ii) $C_j$ and $T_j$ (i=1, ... N) are the counters and average timestamps provided by the N input measurement points of the monitoring network MN as a whole at the end of the last marking period.

By applying equation [7] to the exemplary counter and average timestamp values shown in FIG. 8, the following overall average one-way delay $OWD_{OV}$ is obtained:

$$OWD_{OV} = \frac{C_F T_F + C_G T_G + C_H T_H + C_I T_I + C_J T_J}{C_F + C_G + C_H + C_I + C_J} - \frac{C_A T_A}{C_A} = 75.15$$

In case of packet loss $PL_{OV} \neq 0$ during a marking period, the error ERR on the measurement of the overall average one-way delay $OWD_{OV}$ using equation [7] during that marking period is equal to:

$$ERR = \pm \frac{(T_b/4) \cdot PL_{OV}}{C_{OV}^{in}} \qquad [8]$$

where $T_b$ is the marking period and $C_{OV}^{in}$ is the summation of the N counters provided by the N input measurement points of the monitoring network MN as a whole at the end of that marking period.

Besides, an average one-way delay may also be calculated for each cluster of the monitoring network MN.

In particular, the cluster average one-way delay $OWD_{Ci}$ of the multipoint packet flow PF for cluster Ci may be calculated for a marking period as:

$$OWD_{Ci} = T_{Ci}^{out} - T_{Ci}^{in} = \frac{\sum_k C_k T_k}{\sum_k C_k} - \frac{\sum_j C_j T_j}{\sum_j C_j} \qquad [9]$$

wherein:
(i) $C_k$ and $T_k$ are the counters and average timestamps provided by the output measurement points of the cluster Ci at the end of the last marking period; and
(ii) $C_j$ and $T_j$ are the counters and average timestamps provided by the input measurement points of the cluster Ci at the end of the last marking period.

By applying equation [9] to the exemplary counter and average timestamps values shown in FIG. 8, the following cluster one-way delays are obtained:

$$OWD_{C1} = T_{C1}^{out} - T_{C1}^{in} = \frac{C_B T_B + C_C T_C + C_J T_J}{C_B + C_C + C_J} - \frac{C_A T_A}{C_A} = 19.7;$$

$$OWD_{C2} = T_{C2}^{out} - T_{C2}^{in} = \frac{C_D T_D + C_E T_E + C_I T_I}{C_D + C_E + C_I} - \frac{C_B T_B + C_C T_C}{C_B + C_C} = 20;$$

$$OWD_{C3} = T_{C3}^{out} - T_{C3}^{in} = \frac{C_F T_F + C_G T_G}{C_F + C_G} - \frac{C_D T_D}{C_D} = 46; \text{ and}$$

$$OWD_{C4} = T_{C4}^{out} - T_{C4}^{in} = \frac{C_H T_H}{C_H} - \frac{C_E T_E}{C_E} = 50.$$

The calculation of the cluster average one-way delays advantageously provides a statistical indication of how the overall average one-way delay $OWD_{OV}$ is distributed in the various clusters of the monitoring network MN. For instance, with the exemplary values of FIG. 8, the calculation of the cluster average one-way delays indicates that the overall average one-way delay $OWD_{OV}$ of 75.15 ms is mainly accumulated in clusters C3 and C4.

It may be appreciated that, if a cluster Ci comprises a single virtual link (as cluster C4), the above cluster average one-way delay measurement basically is the average one-way delay accumulated by the packets of the multipoint packet flow PF on the corresponding physical link.

If, instead, the cluster Ci comprises more than one virtual link, it is not possible to determine exactly the average-one way delay accumulated by the packets on each virtual link of the cluster Ci.

However, under the assumption that each virtual link of a cluster Ci has one-way delay equal to the cluster average one-way delay $OWD_{Ci}$, a statistical end-to-end average one-way delay $OWD_{(W \to Z)}$ may be calculated for each end-to-end path (W→Z) originating at a measurement point W implemented at one of the N source nodes and terminated at a measurement point Z implemented at one of the M destination nodes, starting from the cluster average one-way delay $OWD_{Ci}$ calculated as described above.

In particular, the cluster(s) crossed by each end-to-end path (W→Z) in the monitoring network MN are preferably identified. With reference to the exemplary monitoring network of FIG. 4:

path A→F: C1→C2→C3;
path A→G: C1→C2→C3;
path A→H: C1→C2→C4;
path A→I: C1→C2; and
path A→J: C1.

Then, an end-to-end average one-way delay $OWD_{(W \to Z)}$ is preferably calculated for each end-to-end path, as a summation of the cluster average one-way delays of the clusters crossed by each end-to-end path. With reference to the exemplary values of counters and average timestamps set forth in FIG. 8, the following end-to-end average one-way delays are therefore calculated:

$$OWD_{(A \to F)} = OWD_{C3} + OWD_{C2} + OWD_{C1} = 46 + 20 + 19.7 = 85.7;$$

$$OWD_{(A \to G)} = OWD_{C3} + OWD_{C2} + OWD_{C1} = 46 + 20 + 19.7 = 85.7;$$

$$OWD_{(A \to H)} = OWD_{C4} + OWD_{C2} + OWD_{C1} = 50 + 20 + 19.7 = 89.7;$$

$$OWD_{(A \to I)} = OWD_{C2} + OWD_{C1} = 20 + 19.7 = 35.7; \text{ and}$$

$$OWD_{(A \to J)} = OWD_{C1} = 19.7.$$

Under the assumption of substantially synchronized measurement points, also average jitter measurements may be performed on the multipoint packet flow PF.

To this purpose, in addition to counters $CX_0$, $CX_1$, each measurement point also preferably stores a timestamp $T_{X(first)}$ of the first packet received during a marking period and a timestamp $T_{X(last)}$ of the last packet received during the same marking period. Exemplary values of counters and timestamps $T_{X(first)}$, $T_{X(last)}$ in the exemplary monitoring network MN of FIG. 4 are set forth in FIG. 9.

According to advantageous variants of the present invention, an overall average one-way jitter $OWJ_{OV}$ for a marking period is preferably calculated according to the following equation:

$$OWJ_{OV} = \frac{T_{out(last)} - T_{out(first)}}{C_{OV}^{out} - 1} - \frac{T_{in(last)} - T_{in(first)}}{C_{OV}^{in} - 1} \quad [10]$$

where:
(i) $T_{out(first)}$ is the timestamp with lowest value amongst the timestamps $T_{X(first)}$ provided by the output measurement points of the monitoring network MN as a whole,
(ii) $T_{out(last)}$ is the timestamp with highest value amongst the timestamps $T_{X(last)}$ provided by the output measurement points of the monitoring network MN as a whole,
(iii) $T_{in(first)}$ is the timestamp with lowest value amongst the timestamps $T_{X(first)}$ provided by the input measurement points of the monitoring network MN as a whole, and
(iv) $T_{in(last)}$ is the timestamp with highest value amongst the timestamps $T_{X(last)}$ provided by the input measurement points of the monitoring network MN as a whole.

Besides, as described above, $C_{OV}^{in}$ and $C_{OV}^{out}$ are the number of packets received as a whole by the N input measurement points and by the M output measurement points, respectively, of the monitoring network MN as a whole during a same marking period.

Figure 9:
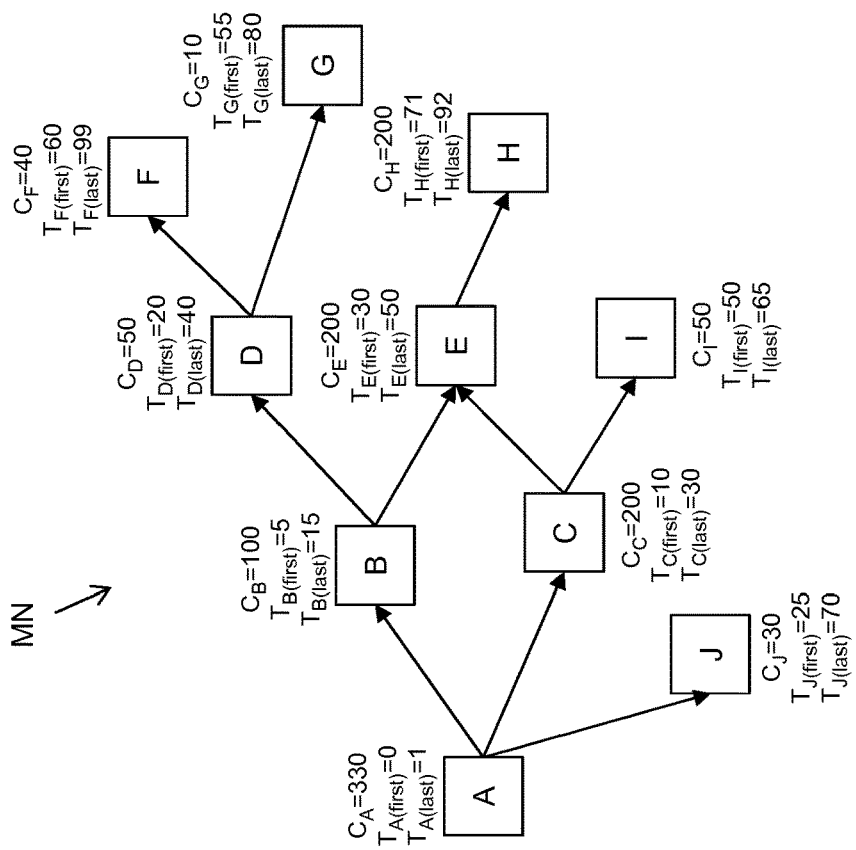
FIG. 9 shows the monitoring network of FIG. 4 with exemplary values of counters and timestamps of the first and last received packet.

Hence, by applying equation [10] to the exemplary values of counters and timestamps set forth in FIG. 9, $T_{out(first)} = T_{J(first)} = 25$, $T_{out(last)} = T_{F(last)} = 99$, $T_{in(first)} = T_{A(first)} = 0$ and $T_{in(last)} = T_{A(last)} = 1$. The overall average one-way jitter $OWJ_{OV}$ is then $[(99-25)/329] - [(1-0)/329] = 0.221$.

According to advantageous variants, a cluster average one-way jitter $OWJ_C$ for each cluster may be calculated. The calculation is similar to the calculation of the cluster average one-way delay described above. Hence, a detailed description will not be repeated.

According to other embodiments of the present invention, an average round-trip delay measurement may be performed. This is particularly advantageous if the clocks of the various measurement points are not reciprocally synchronized.

To this purpose, besides monitoring the multipoint packet flow PF as described above, the measurement points of the monitoring network MN shall also monitor a counter-propagating packet flow PF', having M source nodes corresponding to the M destination nodes of the multipoint packet flow PF and N destination nodes corresponding to the N source nodes of the multipoint packet flow PF. For instance, with reference to the exemplary scenario shown in FIG. 1, the counter-propagating packet flow PF' preferably has N5, N7, N8 and N9 as source nodes and N1 as destination nodes.

It shall be noticed that, in general, the intermediate nodes crossed by the counter-propagating multipoint packet flow PF' may be different from those crossed by the multipoint packet flow PF, e.g. due to an asymmetric routing or due to the fact that, in at least one marking period, no traffic might be present at one or more of the nodes of the subnetwork SN. Herein after, however, for simplicity it is assumed that the intermediate nodes are the same for both PF and PP. Under this assumption, the monitoring network MN and its clusters are the same for both PF and PF', although the measurement points acting as input measurement points for PF will act as output measurement points for PF'm, and vice versa.

Figure 5:
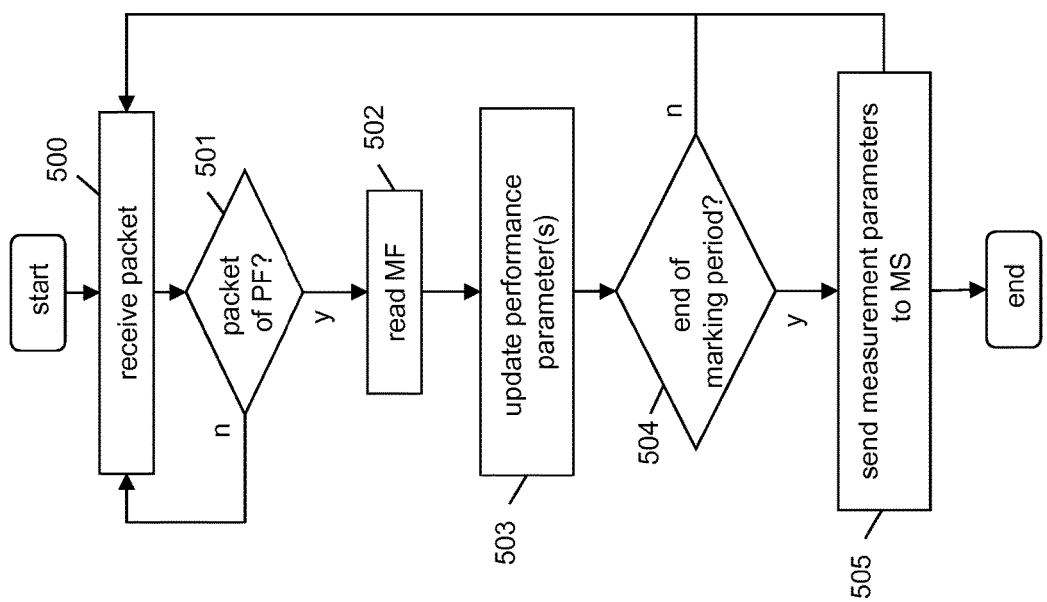
FIG. 5 is flow chart of the operation of each measurement point, according to an embodiment of the present invention.

Hence, at the identification step 501 of the flow chart of FIG. 5, each measurement point X (X=A, B, . . . J) shall identify not only packets of the multipoint packet flow PF, but also packets of the counter-propagating multipoint packet flow PF'. For instance, since the multipoint packet flow PF has a single source node N1, its identification may be done by checking whether the Source Address field of incoming packets comprises the IP address of a host device directly or indirectly connected to N1 (e.g. 192.23.45.67). On the other hand, since the counter-propagating multipoint packet flow PF' has a single destination node N1, its identification may be done by checking whether the Destination Address field of incoming packets comprises the IP address of a host device connected to N1 (e.g. 192.23.45.67).

Then, preferably, at step 503 of the flow chart of FIG. 5, each measurement point X=A, B, . . . J preferably updates performance parameters relating also to the counter-propagating multipoint packet flow PF'.

In particular, in order to enable an average round-trip delay measurement, each measurement point preferably updates a counter $C'_X$ counting the packets of PF' received during a marking period and an average timestamp $T_X$ indicating the average time at which the packets of PF' are received during the marking period.

Figure 10B:
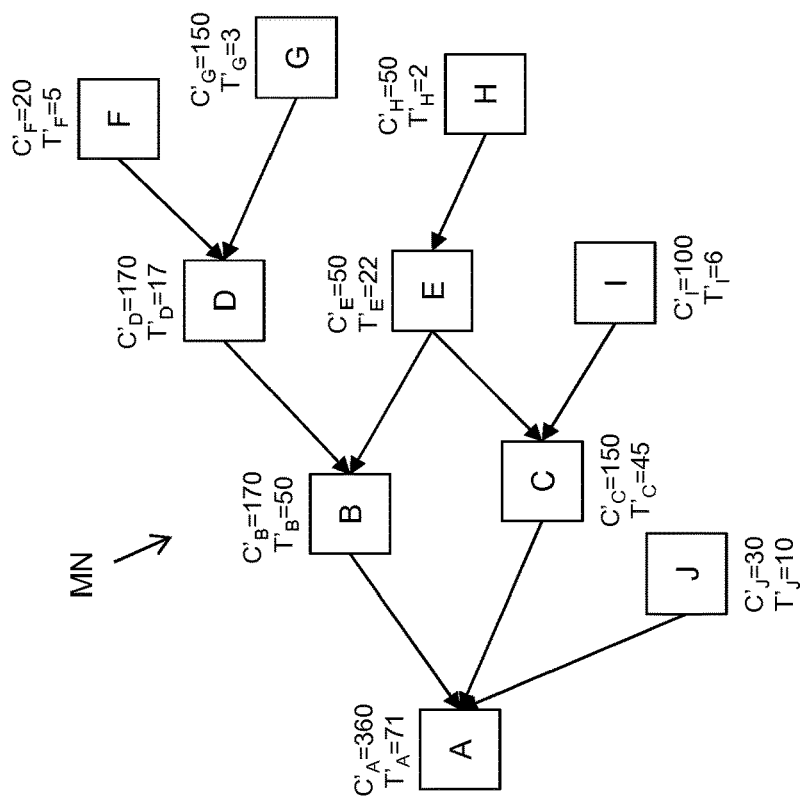
FIGS. 10a and 10b show the monitoring network of FIG. 4 with exemplary values of counters and average timestamps for the multipoint packet flow of FIG. 1 and for a counter-propagating multipoint packet flow, respectively.
Figure 10A:
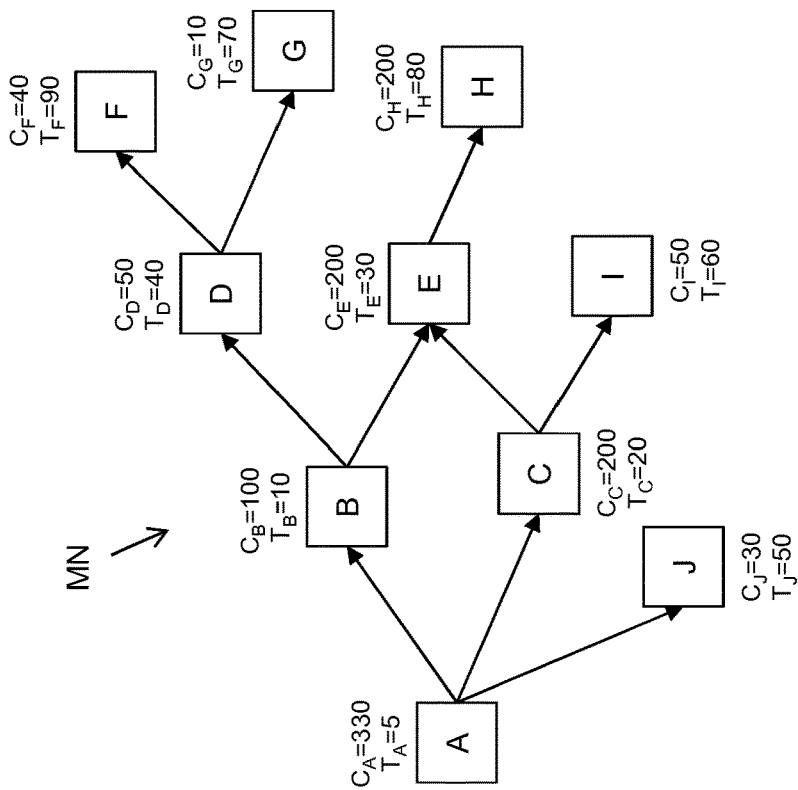

FIGS. 10a and 10b show exemplary values of counters $C_X$ and average timestamps $T_X$ generated by the measurement points X=A, B, . . . J of the exemplary monitoring network MN for the multipoint packet flow PF (FIG. 10a) and exemplary values of counters $C'_X$ and average timestamps $T_X$ generated by the measurement points X=A, B, . . . J of the exemplary monitoring network MN for the counter-propagating multipoint packet flow PF' (FIG. 10b).

Preferably, an overall average round-trip delay $RTD_{OV}$ is calculated as:

$$RTD_{OV} = OWD_{OV} + OWD'_{OV} \quad [11]$$

where $OWD_{OV}$ is the overall average one-way delay of the packet flow PF and $OWD'_{OV}$ is the overall average one-way delay of the packet flow PF'.

However, since the clocks of the various measurement points are not reciprocally synchronized, the overall average one-way delays may not be calculated using the above equation [7]. Reference is made e.g. to FIGS. 11a and 11b, which show exemplary values of counters and average timestamps provided by the measurement points D, F and G of the cluster C3 for PF (FIG. 11a) and for PF' (FIG. 11b), in an exemplary situation wherein the clock of G is delayed by 100 ms relative to the clocks of D and F, which are instead substantially synchronized. Such exemplary values clearly indicate that the one-way delay of the cluster C3 in both propagation directions is 1 ms. However, by applying equations [9] above for calculating the average one-way delays in cluster C3 for PF and PF', the results are:

$$OWD_{C3} = \frac{C_F T_F + C_G T_G}{C_F + C_G} - \frac{C_D T_D}{C_D} = \frac{6 \cdot 1 + 106 \cdot 2}{3} - \frac{5 \cdot 3}{3} = 67.666$$

$$OWD'_{C3} = \frac{C'_D T'_D}{C'_D} - \frac{C'_F T'_F + C'_G T'_G}{C'_F + C'_G} = \frac{6 \cdot 3}{3} - \frac{105 \cdot 1 + 5 \cdot 2}{3} = -32.333$$

The average round-trip delay of cluster C3 calculated by summing up $OWD_{C3}$ and $OWD'_{C3}$ calculated according to equation [9] would be $RTD_{C3} = OWD_{C3} + OWD'_{C3} = 35.333$. This result is however clearly wrong, since it should be equal to 2 ms (1 ms per each propagation direction).

Hence, preferably, instead of using $OWD_{OV}$ and $OWD'_{OV}$ in equation [7], further overall average one-way delays $O\tilde{W}D_{OV}$ and $O\tilde{W}D'_{OV}$ are preferably used in equation [11] for calculating the overall round-trip delay $RTD_{OV}$, which are calculated according to the following equations:

$$O\tilde{W}D_{OV} = \frac{1}{2}\left[\frac{\sum_{k=1}^{M} C_k T_k}{\sum_{k=1}^{M} C_k} - \frac{\sum_{j=1}^{N} C_j T_j}{\sum_{j=1}^{N} C_j} + \frac{\sum_{k=1}^{M} C'_k T_k}{\sum_{k=1}^{M} C'_k} - \frac{\sum_{j=1}^{N} C'_j T_j}{\sum_{j=1}^{N} C'_j}\right] \quad [12a]$$

$$O\tilde{W}D'_{OV} = \frac{1}{2}\left[\frac{\sum_{j=1}^{N} C'_j T'_j}{\sum_{j=1}^{N} C'_j} - \frac{\sum_{k=1}^{M} C'_k T'_k}{\sum_{k=1}^{M} C'_k} + \frac{\sum_{j=1}^{N} C_j T'_j}{\sum_{j=1}^{N} C_j} - \frac{\sum_{k=1}^{M} C_k T'_k}{\sum_{k=1}^{M} C_k}\right] \quad [12b]$$

wherein:
(i) $C_k$ and $T_k$ (i=1, . . . M) are the counters and average timestamps provided by the M output measurement points of the monitoring network MN as a whole for PF;
(ii) $C_j$ and $T_j$ (i=1, . . . N) are the counters and average timestamps provided by the N input measurement points of the monitoring network MN as a whole for PF;
(iii) $C'_k$ and $T'_k$ (i=1, . . . M) are the counters and average timestamps provided by the M input measurement points of the monitoring network MN as a whole for PF';
(iv) $C'_j$ and $T_j$ (i=1, . . . N) are the counters and average timestamps provided by the M output measurement points of the monitoring network MN as a whole for PP.

The overall round-trip delay $RTD_{OV}$ is finally calculated by applying equation [11] to the values of $O\tilde{W}D_{OV}$ and $O\tilde{W}D'_{OV}$ provided by equations [12a] and [12b].

Also average round-trip delay measurement for each single cluster may be performed. Preferably, the average round-trip delay $RTD_{Ci}$ for cluster Ci is calculated according to the following equation:

$$RTD_{Ci} = O\tilde{W}D_{Ci} + O\tilde{W}D'_{Ci} \quad [13]$$

where $O\tilde{W}D_{Ci}$ is the average one-way delay of the packet flow PF in cluster Ci and $O\tilde{W}D'_{Ci}$ is the average one-way delay of the packet flow PF' in cluster Ci, which are preferably calculated according to the following equations:

$$O\tilde{W}D_{Ci} = \frac{1}{2}\left[\frac{\sum_{k=1} C_k T_k}{\sum_{k=1} C_k} - \frac{\sum_{j=1} C_j T_j}{\sum_{j=1} C_j} + \frac{\sum_{k=1} C'_k T_k}{\sum_{k=1} C'_k} - \frac{\sum_{j=1} C'_j T_j}{\sum_{j=1} C'_j}\right] \quad [14a]$$

$$O\tilde{W}D_{Ci} = \frac{1}{2}\left[\frac{\sum_{j=1} C'_j T'_j}{\sum_{j=1} C'_j} - \frac{\sum_{k=1} C'_k T'_k}{\sum_{k=1} C'_k} + \frac{\sum_{j=1} C_j T'_j}{\sum_{j=1} C_j} - \frac{\sum_{k=1} C_k T'_k}{\sum_{k=1} C_k}\right] \quad [14b]$$

wherein:
(i) $C_k$ and $T_k$ are the counters and average timestamps provided by the cluster output measurement points for PF;
(ii) $C_j$ and $T_j$ are the counters and average timestamps provided by the cluster input measurement points for PF;
(iii) $C'_k$ and $T_k$ are the counters and average timestamps provided by the cluster input measurement points for PF';
(iv) $C'_j$ and $T_j$ (i=1, . . . N) are the counters and average timestamps provided by the cluster output measurement points for PF'.

Figure 11B:
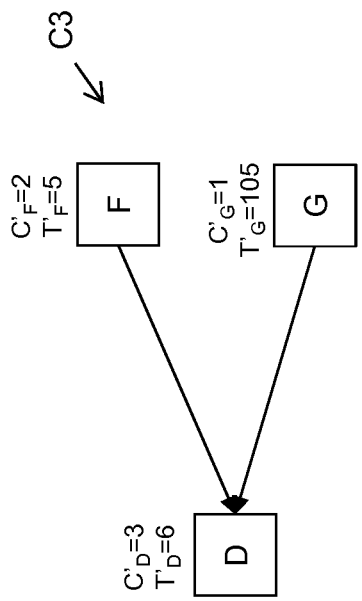
FIGS. 11a and 11b show the cluster of FIG. 7c with exemplary values of counters and average timestamps for the multipoint packet flow of FIG. 1 and for a counter-propagating multipoint packet flow, respectively.
Figure 11A:
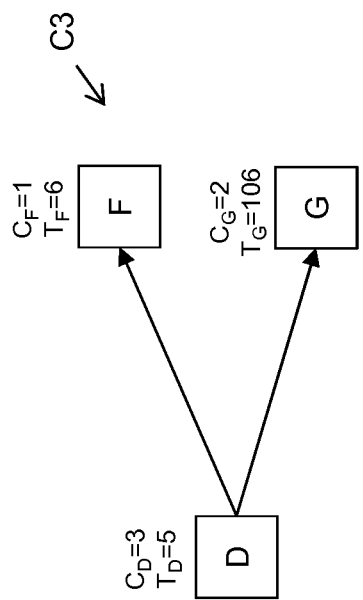

It may be appreciated that application of equations [14a] and [14b] to the exemplary values of FIGS. 11a and 11b provide $O\tilde{W}D_{C3} = 51$ and $O\tilde{W}D'_{C3} = -49$. The average round-trip delay $RTD_{C3}$ of cluster C3 is as per equation [13] is therefore $RTD_{C3} = O\tilde{W}D_{Ci} + O\tilde{W}D'_{Ci} = 2$ ms, which is a correct result.

The invention claimed is:

1. A method for performing a cumulative performance measurement on a multipoint packet flow transmitted in a subnetwork of a packet-switched communication network, the method comprising:
a) implementing in the subnetwork a monitoring network including a plurality of measurement points;
b) before transmitting each packet of the multipoint packet flow, marking the packet by setting a marking field thereof to a marking value equal to either a first marking value or a second marking value, the marking including periodically switching between the first marking value and the second marking value;
c) at each measurement point of the monitoring network, receiving at least one of the marked packets and, if the at least one of the marked packets is marked by the first marking value, updating a performance parameter;
d) providing the cumulative performance measurement on the multipoint packet flow, the providing comprising:
identifying in the monitoring network a cluster of measurement points, the cluster of measurement points being a set of measurement points of the monitoring network selected so that, if no packet loss occurs, each packet received by at least one input measurement point of the cluster is also received at least at one output measurement point of the cluster; and providing a cumulative input performance parameter on the multipoint packet flow based on performance parameters provided by the at least one input measurement point of the cluster, providing a cumulative output performance parameter on the multipoint packet flow based on performance parameters provided by the at least one output measurement point of the cluster, and providing the cumulative performance measurement on the multipoint packet flow using the cumulative input performance parameter and the cumulative output performance parameter.

2. The method according to claim 1, wherein the identifying the cluster comprises:
(i) identifying in the monitoring network each couple of measurement points connected by a respective virtual link;
(ii) grouping couples of measurement points having a same originating measurement point; and
(iii) further grouping couples and/or group of couples having at least one terminating measurement point in common, the further grouping providing the cluster.

3. The method according to claim 2, wherein d) further comprises:
identifying at least two adjacent clusters and grouping the at least two clusters in a further cluster; and
providing the performance measurement on the multipoint packet flow using performance parameters provided by at least one input measurement point and at least one output measurement point of the further cluster.

4. The method according to claim 3, wherein the further cluster is the monitoring network as a whole.

5. The method according to claim 1, wherein at b) the switching between the first marking value and the second marking value is performed for all the packets of the multipoint packet flow with a maximtun mismatch of half a marking period.

6. The method according to claim 1, wherein c) includes identifying the at least one marked packet by checking whether at least one identification field of the at least one marked packet has a predefined value, the at least one identification field comprising a source address field and/or a destination address field.

7. The method according to claim 6, wherein at d) the providing the performance measurement includes calculating a packet loss for the cluster as a difference between:
a summation of counters provided by the at least one input measurement point of the cluster at the end of the marking period; and
a summation of counters provided by the at least one output measurement point of the cluster at the end of the marking period.

8. The method according to claim 7, wherein at d) the providing the performance measurement includes calculating an average one-way delay for the cluster as a difference between an average output timestamp and an average input timestamp, wherein:
the average output timestamp is a weighted summation of average timestamps provided by the at least one output measurement point at the end of the marking period divided by the summation of counters provided by the at least one output measurement point, the weight for the average timestamp provided by each output measurement point being the counter provided by the same output measurement point; and
the average input timestamp is a weighted summation of average timestamps provided by the at least one input measurement point at the end of the marking period divided by the summation of counters provided by the at least one input measurement point, the weight for the average timestamp provided by each input measurement point being the counter provided by the same input measurement point.

9. The method according to claim 7, wherein at d) the providing the performance measurement includes calculating a jitter based on:
a timestamp provided by the at least one input measurement point for a first packet received during the marking period and a timestamp provided by the at least one input measurement point for a last packet received during the marking period;
a timestamp provided by the at least one output measurement point for a first packet received during the marking period and a timestamp provided by the at least one output measurement point for a last packet received during the marking period; and
a number of packets received as a whole by the at least one input measurement point and number of packets received as a whole by the at least one output measurement point.

10. The method according to claim 7, wherein at d) the providing the performance measurement includes calculating an average round-trip delay for the cluster by:
calculating a first average one-way delay for the cluster in a first direction and a second average one-way delay for the cluster in a second direction opposite to the first direction; and
calculating the average round-trip delay as a sum of the first average one-way delay and the second average one-way delay.

11. The method according to claim 1, wherein c) performed by each measurement point includes updating a counter indicative of a number of packets marked by the first marking value received at the measurement point during a marking period.

12. The method according to claim 11, wherein c) performed by each measurement point includes updating an average timestamp indicative of an average time at which packets marked by the first marking value are received at the measurement point during a marking period.

13. The method according to claim 1, wherein d) includes providing at least one statistical performance measurement of the multipoint packet flow along an end-to-end path of the monitoring network by:
identifying K cascaded clusters of the monitoring network which are crossed by the end-to-end path, K being equal to or higher than 2; and
providing the at least one statistical performance measurement using performance measurements provided for the K cascaded clusters.

14. The method according to claim 13, wherein the providing the statistical performance measurement includes providing a statistical packet loss measurement for the end-to-end path by:
calculating a cumulative packet loss probability of the K cascaded clusters as a function of packet losses probabilities of the K cascaded clusters; and calculating the statistical packet loss measurement for the end-to-end path as a function of the cumulative packet loss probability and a number of packets received at a measurement point terminating the end-to-end path.

15. The method according to claim 13, wherein the providing the statistical performance measurement includes providing a statistical average one-way delay measurement for the end-to-end path by:

calculating the statistical average one-way delay measurement for the end-to-end path as a summation of average one-way delays of the K cascaded clusters.

16. A packet-switched communication network comprising:

a subnetwork configured to support transmission of a multipoint packet flow, each packet of the multipoint packet flow including a marking field set to a marking value equal to either a first marking value or a second marking value, the marking value being periodically switched between the first marking value and the second marking value;

a monitoring network including a plurality of measurement points implemented in the subnetwork, each measurement point being configured to receive at least one of the marked packets and, if the at least one of the marked packets is marked by the first marking value, update a performance parameter; and a management server configured to provide a cumulative performance measurement on the multipoint packet flow, the management server being configured to:

identify in the monitoring network a cluster of measurement points, the cluster of measurement points being a set of measurement points of the monitoring network selected so that, if no packet loss occurs, each packet received by at least one input measurement point of the cluster is also received at least at one output measurement point of the cluster; and provide a cumulative input perfoiiiiance parameter on the multipoint packet flow based on performance parameters provided by the at least one input measurement point of the cluster, provide a cumulative output performance parameter on the multipoint packet flow based on performance parameters provided by the at least one output measurement point of the cluster, and provide the cumulative performance measurement on the multipoint packet flow using the cumulative input performance parameter and the cumulative output performance parameter.

17. A non-transitory computer readable medium including a computer program product loadable in the memory of at least one computer and including software code portions for performing the method of claim 1, when the product is run on at least one computer.

* * * * *